R. C. LOWES.
RUBBING POST FOR ANIMALS.
APPLICATION FILED JAN. 11, 1915.
1,270,425.
Patented June 25, 1918.
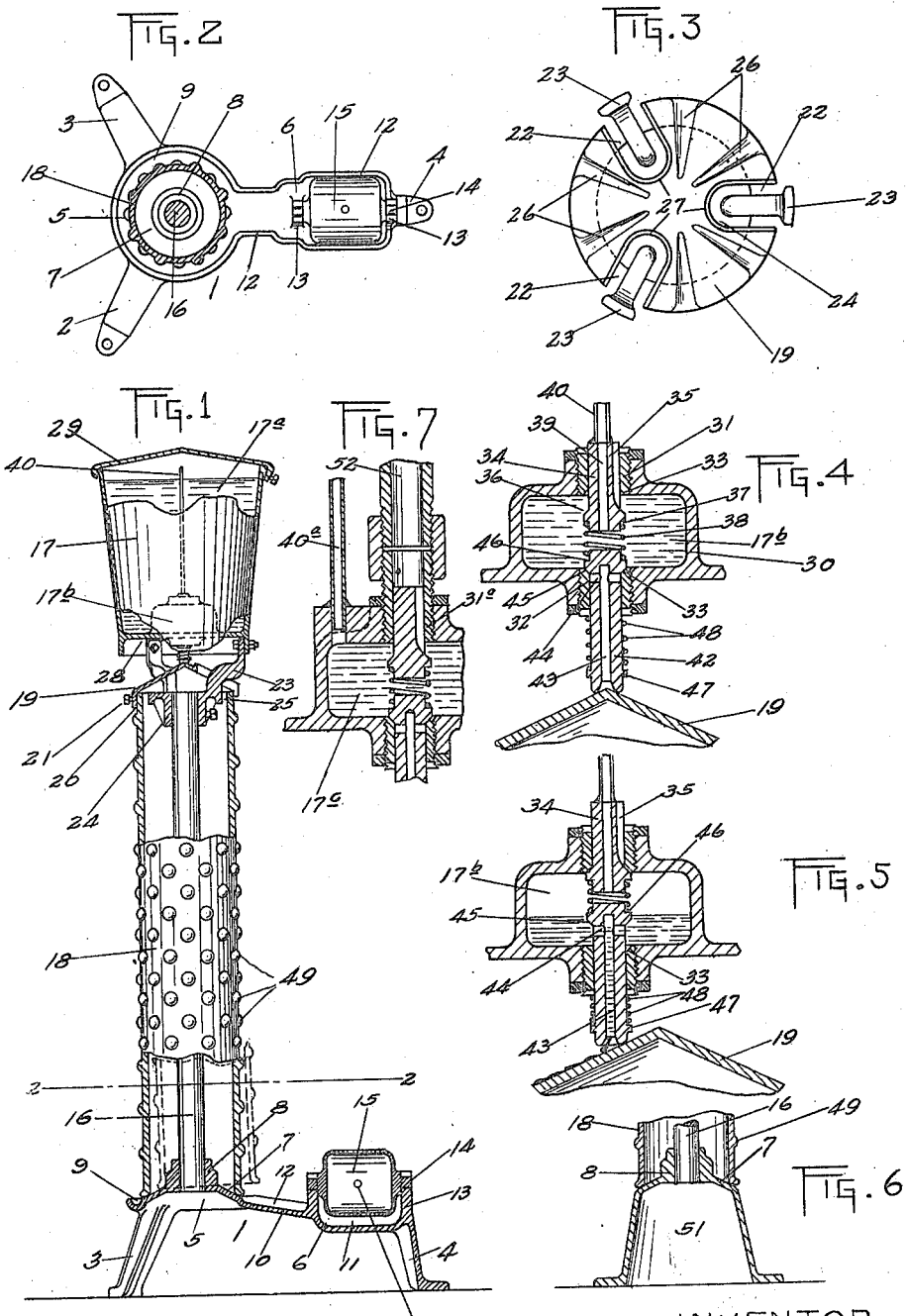

UNITED STATES PATENT OFFICE.

RALPH C. LOWES, OF PEORIA, ILLINOIS.

RUBBING-POST FOR ANIMALS.

1,270,425.   Specification of Letters Patent.   Patented June 25, 1918.

Application filed January 11, 1915. Serial No. 1,504.

*To all whom it may concern:*

Be it known that I, RALPH C. LOWES, a citizen of the United States, a resident of Peoria, in the county of Peoria and State of Illinois, have invented new and useful Improvements in Rubbing-Posts for Animals, of which the following is a specification.

This invention has reference to rubbing posts for animals, such as hogs or cattle, and in fact any animal which it is the desire to treat with a medicament for the purpose of keeping the skin of the animal in a healthy condition, or to treat it for skin diseases, or for the extermination of lice or ticks, or other vermin, with which an animal may happen to be afflicted.

One of the objects of the present invention is to provide a device of the character described having a rubbing member engageable by an animal approaching it from any direction, and adapted under pressure of the animal to actuate suitable feeding means for discharging onto said rubbing member a suitable oil or liquid medicament which becomes smeared over that part of the animal which is rubbed against said rubbing member.

The invention has for a further object to provide in a device of the character described, one or more rubbing members communicating with a supply of soft oil or other liquid medicament; one of said members being adapted for an animal to rub its shoulders thereagainst, or for rubbing behind its ears, its sides, back and hams, or any other part of its anatomy; and the other of said members being adapted for an animal to rub under its fore or hind legs, and on jowl and belly, and other portions of its anatomy.

A further object of the invention is to provide in a device of the character described, a rubbing member adapted to actuate a feeding means, whereby there is discharged on to the rubbing member and subsequently smeared onto the body of the animal, a soft oil or liquid medicament; the arrangement of the feeding means or control therefor, being such that an animal bearing against the rubbing member in a manner to release the oil or liquid medicament thereon, and holding such member in an actuated position, only a given quantity of the oil or liquid medicament will be discharged onto the rubbing member and no more. The construction of the rubbing member and feeding means of control therefor, requires that the member be successively actuated alternately in opposite directions to insure the required amount of oil or liquid medicament reaching the body of the animal. Thus there is obviated all danger of waste of the liquid medicament, which is a common failure in most of the prior devices of this character because of the feed being open when an animal leans against the rubbing member and holds it in its operating position, rendering them too expensive for ordinary use.

The invention comprises essentially a support, a source of supply for a soft oil or liquid medicament, and a chamber for receiving from said source of supply, a limited quantity of such oil or liquid medicament, and a valve controlling the supply to the chamber from the source of supply, a valve for controlling the release of the oil or medicament from the chamber to the body of the animal, and a rubbing member having an upper conical surface, said member adapted to be raised by pressure of an animal thereagainst and when so raised to cause its conical surface to ride against and open the valve controlling the discharge of oil or liquid medicament from the chamber onto the rubbing member, said aforesaid valves being connected so that when the valve controlling the discharge from the chamber is opened, the valve controlling the discharge from the supply to the chamber is closed and vice versa.

In the drawings, accompanying and forming part of this specification and in the description of the drawings, I have shown my invention in its preferred forms, and have shown the best mode of applying the principles thereof; but it is to be understood that I contemplate changes in form, proportions, and materials, the transposition of parts, and the substitution of equivalent members, without departing from the spirit of the invention; within the scope of the appended claims.

Figure 1 is a side elevation, greatly reduced and partly in section, of my improved rubbing post;

Fig. 2 is a plan view, partly in section, as the same would appear if taken on the line 2—2 of Fig. 1;

Fig. 3 is a plan view of the upper end of the rubbing member and support for a tank to be supported above the same;

Fig. 4 is a detail, in section, showing the chamber for holding a given quantity of oil or liquid medicament, the valves for controlling the supply to and from said chamber and the upper end of the rubbing member, the latter being in an inoperative position;

Fig. 5 is a view similar to Fig. 4, except that the rubbing member has been moved to an operative position, opening the valve to release the oil or liquid medicament from the chamber and closing the valve controlling the supply to the chamber;

Fig. 6 shows a modified view of the lower end of the device, omitting one of the rubbing members, and Fig. 7 shows a modified view of the feed between the source of supply and the chamber.

Like characters of reference denote corresponding parts throughout the figures.

A base which supports the animal rubbing members and other operative parts of the device is designated as 1. In Figs. 1 and 2, this base has preferably three legs, 2, 3 and 4, the legs 2 and 3 extending radially from the main portion 5 of the base 1, and the leg 4 extending from an extension 6 of said base 1.

The main portion 5 of the base is of annular formation, see Fig. 2, and provided with a conical surface 7, terminating in a centrally disposed and vertically extending boss 8. At the base of the conical surface 7, the portion 5 of the base is surrounded by a trough 9. Extending laterally from the portion 5 of the base is the extension 6. This extension is inclined downwardly, as at 10 and terminates in a cup 11. The portions 10 and 11 of the extension 6, are bounded by walls 12, producing a sort of trough, or a continuation of the trough 9. At opposite sides of the cup 11, the extension 6 is provided with upstanding lugs 13 forming bearings for the trunnions 14 of the cylinder 15. This cylinder serves as a rubbing member for smaller animals, or for use by an animal when rubbing under the fore and hind legs, and on jowl and belly, or other portions of the anatomy which it is inconvenient to rub on the main rubbing member, to be described.

Secured in the boss 8 of the base 1, and uprising from said base to a suitable height, is a rod or standard 16, and said rod or standard serves as the supporting means for the supply tank 17, or the connections which communicate with a suitable source of supply for feeding soft oil or liquid medicament to the rubbing member or members.

18 designates the main rubbing member of the device, against which an animal may rub its shoulders, behind its ears, its sides, back and hams, or any other part of its anatomy. This rubbing member is made preferably in the form of a cylinder, as shown, its lower end adapted to rest on the conical surface 7 of the portion 5 of the base 1, and when engaged by an animal adapted to ride up on the conical surface 7, in a manner seen in dotted lines in Fig. 1. The cylinder 18 rises to the height of the rod or standard 18 and to the upper end of said cylinder is attached a cap 19, said cap being preferably conical in shape, with a depending flange 20, adapted to overlie and surround the upper end of the cylinder 18 and be secured in position thereon by means of the bolts 21 or other suitable means.

The cap 19 is provided with a plurality of radial slots 22, extending from the outer edge of the cap to a point near the center, see Fig. 3, and through said slots protrude the upstanding radial arms 23, attached to or forming a part of a hub 24 secured to the upper end of the rod or standard 16, within the cylinder 18. Between the peripheral surface of the hub 24 and the inner wall of the cylinder 18 there is an annular space 25 of suitable width and such space determines the distances which the upper end of the cylinder 18 may be moved off center by the engagement of an animal, when the lower end of the cylinder is moved to a position corresponding to the dotted line position shown in Fig. 1.

The surface of the conical cap 19 is provided with a plurality of radially arranged recesses or grooves 26, see Fig. 3. Starting near the center or apex of the cap these recesses or grooves are very narrow and widen out to a suitable width at the edge of the cap, and surrounding the radial slots 22 are walls 27, the purposes of which will be hereafter explained.

The upstanding radial arms 23 from the hub 24 support the tank 17, referred to. This tank may be of any suitable size with its bottom 28 spaced a short distance above the apex of the cap 19, and said tank has the cover or lid 29 by means of which access may be had to the tank to fill it with a vermin or crude oil, or a suitable liquid medicament.

The tank 17 is divided into a main chambered portion $17^a$ and an auxiliary but much smaller chambered portion $17^b$, the latter adapted to receive and contain only a small quantity of oil or liquid medicament, whereby, when the rubbing member 18 is moved by an animal to an operative position the substance contained in the chamber $17^b$ will be released on to the rubber member and if the animal rests against the rubbing member 18 holding it in such operative position, no more substance will be released than is contained in the chamber $17^b$, thereby obviating waste of such substance.

The chamber $17^b$ is formed by the bottom 28 of the tank and the inner casing wall 30, preferably integral with the bottom 28. In the upper wall of the inner casing 30 and in the bottom 28, in axial alinement with each other and the apex of the cap 19 when the cylinder 18 is in its normal position I provide bushings 31 and 32, each provided with valve seats 33. Extending down through the bushing 31 is a valve stem 34 terminating in the chamber 17$^b$ and formed with an inlet duct 35 along one side to form a connection between the main chamber 17$^a$ and the auxiliary chamber 17$^b$, an annular shoulder 36 adapted to seat itself against the valve seat 33 of the bushing 31 to close the inlet between the chambers 17$^a$ and 17$^b$, and also provided with an annular shoulder 37 on its inner end against which is seated one end of a coil spring 38. The valve stem 34 has a central opening 39 therethrough and connected with the upper end of the stem 34 is a tube 40 leading up to a point near the top of the tank 17 through which air is forced and the provision of which will prevent a vacuum in said chamber 17$^b$, the creation of which would seriously interfere with the proper feeding of oil or liquid medicament from said chamber.

Passing through and operatively carried in the bushing 32 is a valve stem 42. This stem is provided with a longitudinal duct 43 opening out of the lower exposed end of said stem and at the upper end of the stem communicating with transverse ducts 44, adapted, when the stem 42 is raised by pressure of the cap 19 of the cylinder 18 thereagainst to communicate with the chamber 17$^b$. Said stem 42 is also provided with an annular shoulder 45 adapted to seat itself against the valve seat 33 of the bushing 32 to close the outlet from the chamber 17$^b$ through the ducts 44 and 43. Said stem 42 is further provided with an annular shoulder 46, on its inner end against which is seated the lower end of the coil spring 38, the opposite end of which as described, bears against the lower end of the stem 34. The lower outer end of the stem 42 is provided with an annular flange or shoulder 47 and encircling said stem between said shoulder 47 and the lower end of the bushing 32, is a spring 48. This spring tends to normally hold the stem 42 in its lowermost position, see Fig. 4, with its shoulder 45 closed against the valve seat 33 closing the ports 44 and 43 against the egress of substance from the chamber 17$^b$. In this position, the valve stem 34 is in its lowermost or open position leaving open communication through the duct 35 from the main chamber 17$^a$ to the auxiliary chamber 17$^b$.

To make it easy for an animal rubbing against the member 18 to lift the member and move its upper end off center and to move the valve stem 42 to operative position, I provide the outer surface of the member 18 with roughened portions, preferably knobs 49, arranged in circumferential rows on the member and staggered. Such a surface not only facilitates the easy operation of the member when engaged by an animal, but distributes the oil or liquid medicament finding its way onto such surface and spreads it on the animal.

I will now describe the operation of the device, it being understood that because the member 18 is cylindrical in cross-section an animal may approach and engage it from any direction and through such engagement and an up and down movement, such as an animal goes through when in the act of rubbing against an object, the member 18 is moved off center and upward, the conical cap 19 assuming a position somewhat as shown in Fig. 5, lifting the valve stem 42 and through the spring 38 also lifting the valve stem 34. Such movement of the stems places the ducts 44 and 43 in communication with the chamber 17$^b$ allowing the substance contained therein to find egress through the ducts 44 and 43 onto the conical surface of the cap 19 and thence down onto the rubbing surface of the member 18 and onto the body of the animal. The upward movement of the stem 34 will close the duct 35 and shut off the supply of the substance from the source of supply to the chamber 17$^b$, and while the two stems 34 and 42 are in their respective positions, shown in Fig. 5, the only substance which will find its way to the rubbing member 18 and body of the animal, is that portion contained in the chamber 17$^b$. When the animal moves to permit the member 18 to return to its normal position in full lines in Fig. 1, the spring 48 will act to lower the stem 42 to close the ducts 44 and 43 therein, shutting off the supply through said stem, while at the same time, the stem 34 returns to its lowest normal position, opening the duct 35 and permitting the flow of the oil or liquid medicament from the source of supply to the chamber 17$^b$, ready for the next upward movement of the member 18.

When the oil or liquid medicament, which is released from the chamber 17$^b$, discharges onto the conical surface of the cap 19, it will flow down through one or the other of the recesses or grooves 26 in said cap 19, which insures the same flowing down that portion of the surface of the member 18 against which the animal is rubbing. The walls 27 surrounding the slots 22 in the cap 19 will prevent the oil or liquid medicament flowing through the slots 22 down into the member 18 and insures the same passing around said walls and down on the outside of the member 18.

Any excess oil or liquid medicament which is not taken up by the animal and which flows down to the lower end of the member 18 will drip into the trough 9, flow down over the inclined portion 10 of the base to be taken up by the small cylinder 15. The wall of the cylinder 15 is preferably perforated as at 50, to permit the oil or liquid medicament to enter the cylinder, which will serve to store the same and prevent overflow from the cup 11, unless of course the excess supply dripping from the member 18 is in excess of the amount taken up by animals rubbing on the member 15.

With the structure shown it takes very little power to move the member 18 off center and to lift it to open the valve stem 42, and when released it immediately returns to its normal or inoperative position, being that position shown in full lines in Fig. 1. In fact practice has demonstrated that it is practically impossible to prevent the return of the member 18 to its normal position, after being operated.

Fig. 6 shows how the device may be made without the additional rubbing member 15, providing a machine which may be marketed at less cost than that shown in Fig. 1. In this structure the extension 6 is left off, and a suitable base, such as 51, may be provided.

Instead of providing each device with a tank 17, I may arrange each device with a supply chamber 17ᶜ, Fig. 7, supported by the post or standard 16 and connect a series of such devices with a common supply, not shown, located at some remote point from the devices. In this structure the bushing 31ᵃ has connected therewith a supply pipe or tube 52 connected with the supply, and the air tube or pipe 40ᵃ leads from the chamber 17ᶜ, to one side of the valve stem 34, as shown, terminating at a suitable point adjacent the supply. In all other respects, the devices would be the same as shown in Fig. 1, or without the additional rubbing member 15, if desired, Fig. 6.

What I claim is:

1. In a device of the character described, in combination, a source of supply for an oil or liquid medicament, a valve member for controlling the discharge thereof, and an upstanding rubbing member having a roughened surface engageable by an animal approaching it from any direction, and having a conical portion adapted for operating said valve member, said rubbing member, adapted under pressure by the animal, to be raised causing its conical portion to ride up under the valve member, while at the same time operating the same to release the oil or liquid medicament on to said rubbing member.

2. In a device of the character described, in combination, a support, a source of supply for an oil or liquid medicament, a chamber on the support for storing a suitable quantity of said oil or liquid medicament, a valve controlling the feed from the supply to the chamber and a valve for controlling the discharge from said chamber, said valves adapted to operate in unison so that when one is closed, the other is opened, an upstanding rubbing member having a roughened surface engageable by an animal approaching it from any direction, and having a conical portion adapted for operating said valves, said rubbing member, adapted under pressure by the animal to be raised causing its conical portion to ride up under one of said valves, while at the same time operating the same to release the oil or liquid medicament from the storage chamber on to said rubbing member.

3. In a device of the character described, in combination, an upstanding support, a source of supply at the head of said support for an oil or liquid medicament, a valve controlling the release of said oil or liquid medicament from said source of supply, an animal rubbing device comprising a cylindrically shaped member encircling the support and adapted, under pressure by an animal to be raised slightly and moved off of its center, a cap for the rubbing member having a conical surface, said cap when the member is raised, adapted to operate said valve to release the oil or liquid medicament on to said rubbing member.

4. In a device of the character described, in combination, an upstanding support, a source of supply at the head of said support for an oil or liquid medicament, a valve controlling the release of said oil or liquid medicament from said source of supply, an animal rubbing member comprising an elongated cylinder encircling said support, the surface of said cylinder provided with knobs forming a roughened surface therefor, a cap for the upper end of said cylinder having a conical surface, said rubbing member, adapted under pressure by an animal, to be raised causing said conical shaped cap to ride up under the valve, while at the same time operating the same to release the oil or liquid medicament on to said rubbing member.

5. In a device of the character described, in combination, a base, having a conical surface, a support extending up from the center of the conical surface of said base, a chambered casing at the head of the support for containing an oil or liquid medicament, a valve controlling the discharge therefrom, an animal rubbing member encircling said support and resting on said conical surface of the base, a cap for the upper end of said rubbing member, said cap having a conical surface, said rubbing member, adapted under pressure by an animal to be raised on the conical surface of the base inclining said member in a manner to cause the conical cap to ride up under the valve, while at the same time operating the same to release the oil or liquid medicament on to said rubbing member.

6. In a device of the character described, in combination, a base, a support uprising from said base, an animal rubbing device, comprising a member encircling said support, a cap for said member, said cap having a conical surface and provided with a plurality of radial slots, supporting means secured to the upper end of said support and uprising therefrom and passing through the slots in said cap, a chambered casing mounted on said supporting means, means for supplying said casing with an oil or liquid medicament, a valve for controlling the discharge of oil or liquid medicament from said casing, said valve being located immediately above the apex of the surface of said cap, said rubbing member, adapted under pressure by an animal to be raised causing said cap to ride up under said valve, while at the same time operating the same to release the oil or liquid medicament on to said rubbing member.

7. In a device of the character described, in combination, a base, said base having a conical surface, an animal rubbing member supported on said base in a manner to ride on said conical surface when an animal rubs thereagainst, a receptacle for containing a supply of oil or liquid medicament, a valve for controlling the discharge from said receptacle, and means on said member adapted when the member is moved to operate said valve to release the oil or liquid medicament on to said member.

8. In a device of the character described, and in combination, a support, a hollow cylindrical rubbing member mounted thereon, so that it may tilt on its lower edge, a receptacle for a suitable substance mounted on said support above said cylindrical rubbing member, a charge compartment adapted to receive a suitable quantity of material from said receptacle, a valve for controlling the supply of material from said receptacle into said charge compartment and an additional valve for controlling the discharge of the material from said charge compartment on to said cylindrical rubbing member, said cylindrical rubbing member being adapted to actuate said valves, a spring for normally holding said last mentioned valve closed and an additional spring interposed between said last mentioned and said first mentioned valves adapted, when said last mentioned valve is opened, to close said first mentioned valve.

9. In a device of the character described, and in combination, a support, a hollow cylindrical rubbing member mounted thereon, so that it may tilt on its lower edge, a receptacle for a suitable substance mounted on said support above said cylindrical rubbing member, a charge compartment adapted to receive a suitable quantity of material from said receptacle, a valve for controlling the supply of material from said receptacle into said charge compartment and an additional valve for controlling the discharge of the material from said charge compartment on to said cylindrical rubbing member, said cylindrical rubbing member being adapted to actuate said valves, a spring for normally holding said last mentioned valve closed, and an additional spring interposed between said last mentioned and said first mentioned valves, adapted when said last mentioned valve is opened, to close said first mentioned valve, and an air vent pipe leading into said charge compartment.

10. In a device of the character described, and in combination, a support, a hollow cylindrical rubbing member mounted thereon, so that it may tilt on its lower edge, a receptacle for a suitable substance mounted on said support above said cylindrical rubbing member, a charge compartment adapted to receive a suitable quantity of material from said receptacle, a valve for controlling the supply of material from said receptacle into said charge compartment and an additional valve for controlling the discharge of the material from said charge compartment on to said cylindrical rubbing member, said cylindrical rubbing member being adapted to actuate said valves, connections between said valves so that when said first mentioned valve is opened, said second mentioned valve is closed, said first mentioned valve being provided with a passage therethrough into said charge compartment, and an air vent pipe connected to said first mentioned valve and communicating with said passage.

11. In a device of the character described and in combination, a support, a vertical member secured thereto, a spider member having a plurality of arms projecting therefrom secured to the upper end of said member, a cylindrical rubbing member mounted on said support and being hollow to receive said vertical member and having openings through the upper end thereof to permit the passage of said arms of the spider, said cylindrical rubbing member being adapted to be tilted on its lower edge, a receptacle supported on said arms of the spider and having a valve for controlling the discharge of the material therefrom, said cylindrical rubbing member when tilted, being adapted to actuate said valve.

12. A hog oiler comprising a stationary shaft, a rubbing sleeve loosely embracing the same, a reservoir for the containing of a desired medicament, and means operable on movement of said sleeve for delivering medicament from said reservoir.

13. A device of the character described, including in combination, a support, a receptacle mounted thereon, a cylindrical rubbing member mounted thereon capable of being tilted on its lower end, a valve for controlling the discharge of material from said receptacle and having a member depending therefrom, means on the rubbing member adapted to engage said depending member when the rubbing member is tilted to permit the discharge of material from said receptacle onto said rubbing member, said engaging means being adapted to direct the discharged material down the side of the rubbing member against which pressure is applied to tilt the same.

14. A device of the character described, including in combination, a base, supporting means extending upwardly therefrom, a cylindrical rubbing member tiltably mounted on said base, a receptacle supported by said support and spaced from said rubbing member, a valve member for controlling the discharge of material from said receptacle, and means for engaging the valve member when the rubbing member is tilted to discharge material from said receptacle and to direct discharged material on to the side of the rubbing member against which pressure is applied.

15. A device of the character described, including in combination, a stationary support, a cylindrical rubbing member loosely embracing said support and capable of being tilted on its lower end, a receptacle for containing material, and connections between said receptacle and said rubbing member for discharging material from said receptacle on to the rubbing member when the rubbing member is tilted.

16. A device of the character described, including in combination, a base, a stationary supporting member extending upwardly therefrom, a receptacle supported by said supporting member, a cylindrical rubbing member mounted to tilt on its lower end on said base and embracing said supporting member and connections between said rubbing member and said receptacle whereby when the rubbing member is tilted, material will be discharged from said receptacle so as to reach said rubbing member.

17. A device of the character described, including in combination, a support, a receptacle mounted thereon, an elongated rubbing member mounted on said support to tilt in any direction, and connections between said rubbing member and said receptacle whereby when said rubbing member is tilted, material will be discharged from said receptacle and discharged material will reach the side of the rubbing member against which pressure is applied to tilt the same.

18. A hog oiler comprising a stationary shaft, a rubbing sleeve loosely embracing the same, a reservoir for the containing of a desired medicament, and means operable on movement of said sleeve for releasing medicament from said reservoir.

RALPH C. LOWES.

Witnesses:
J. M. ANDERSON,
P. M. COPELAND.

Copies of this patent may be obtained for five cents each, by addressing the "Commissioner of Patents, Washington, D. C."